UNITED STATES PATENT OFFICE.

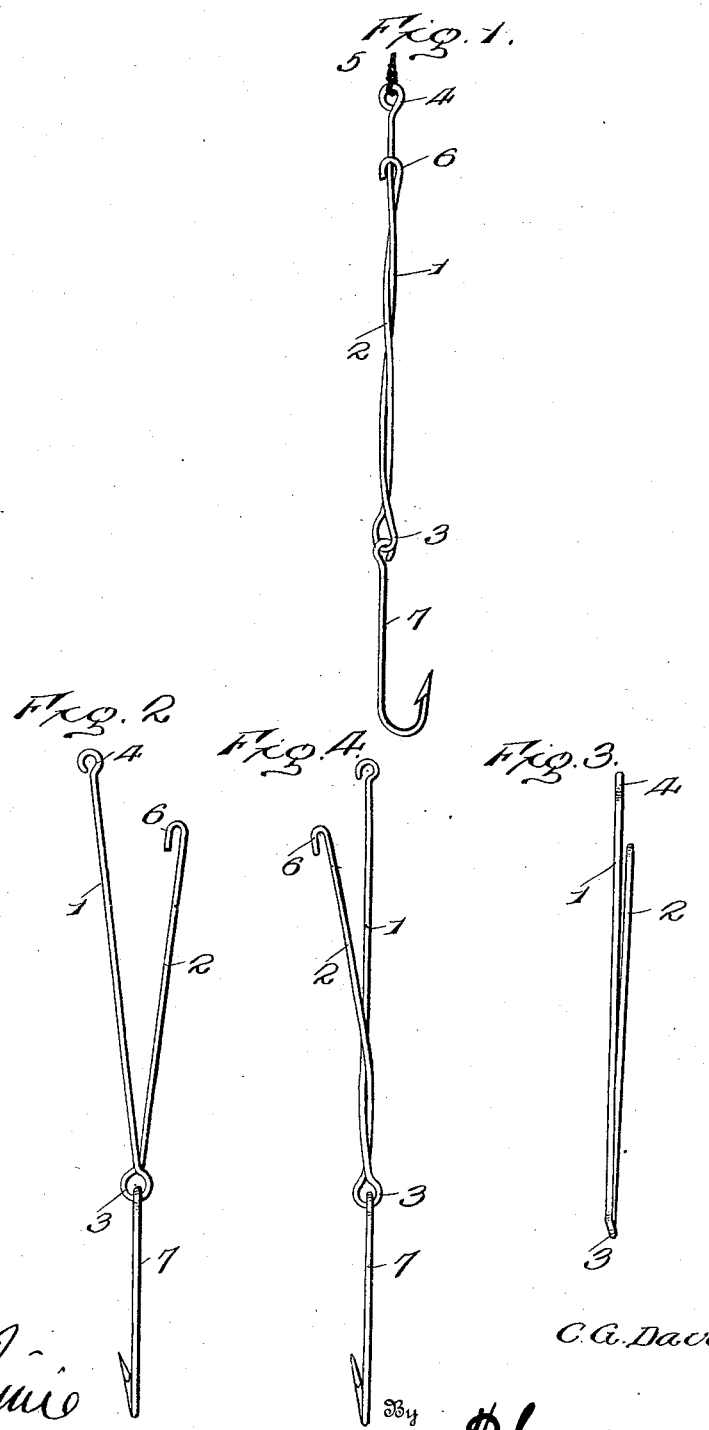

CLEVELAND G. DAVIS, OF MANISTEE, MICHIGAN.

COUPLING-LINK FOR FISH-HOOKS.

No. 918,017.  Specification of Letters Patent.  Patented April 13, 1909.

Application filed April 15, 1908. Serial No. 427,174.

*To all whom it may concern:*

Be it known that I, CLEVELAND G. DAVIS, citizen of the United States, residing at Manistee, in the county of Manistee and State of Michigan, have invented certain new and useful Improvements in Coupling-Links for Fish-Hooks, of which the following is a specification.

The present invention relates to an improved device for connecting a fish hook to a line whereby the former can be easily and quickly removed and replaced without the necessity of cutting and knotting the line in the usual manner.

The object of the invention is to design a device of this character which can be easily and quickly operated to release the hook or engage the same and which will also serve to prevent larger fish from biting or injuring the line.

For a full understanding of the invention and the merits thereof and also to acquire a knowledge of the details of construction and the means for effecting the result, reference is to be had to the following description and accompanying drawings, in which:

Figure 1 is a side elevation of a link member embodying the invention. Fig. 2 is a similar view showing the two arms of the link member as sprung apart and disposed at an angle to each other. Fig. 3 is a similar view looking in a direction at right angles to Fig. 2. Fig. 4 is a side elevation showing the two arms of the link member as partially twisted about each other.

Corresponding and like parts are referred to in the following description and indicated in all the views of the drawings by the same reference characters.

The improved link device for connecting a fish hook to the line is formed from a single piece of spring wire or similar material which is doubled upon itself at an intermediate point to form the two spring arms 1 and 2, a loop or eye 3 being formed at the junction of the said arms and the arms crossing each other and normally tending to assume a position at an angle to each other. The arm 1 is somewhat longer than the arm 2 and is provided at its free end with an eye 4 to which the line 5 is attached in the usual manner. The free end of the shorter arm 2 which owing to its spring action normally tends to assume a position at a slight angle to the arm 1 terminates in a hook or returned portion 6. When these arms 1 and 2 are spread apart as shown in Fig. 2, the eye of a fish hook 7 may be slipped over the end of the shorter arm 2 and caused to engage the loop 3 at the junction of the arms. The arm 2 is then twisted around the arm 1 as indicated in Fig. 1 and the hook 6 at the extremity thereof caused to engage the arm 1. This hook tends to hold the two arms 1 and 2 in engagement with each other so that the fish hook is retained against displacement and any pull upon the fish hook is readily transmitted through the link to the line. However should the fish hook become broken or should it for any reason be desired to remove the same the hook 6 is moved laterally and disconnected from the arm 1, whereupon the arm 2 owing to its spring action tends to swing away from the arm 1 and assume a position at an angle thereto as shown in Fig. 2.

With this construction it will be obvious that while the fish hook can be quickly removed from the link and placed thereon, nevertheless it is held securely against accidental displacement and the line is prevented from injury by the larger fish.

Having thus described the invention, what is claimed as new is:

A fish hook attaching link comprising a spring wire doubled upon itself to form two diverged straight members of unequal length having a closed eye at the fold to receive the fish hook, the long member having an eye at its extremity and the short member terminating in a hook, said members being similarly intertwisted throughout their length to form an approximately slender hook, and held in such relation by the hook of the short member engaging the long member and adapted to automatically assume a normal position, that is, with the members straight and diverged, when the hook of the short member is disengaged from the long member.

In testimony whereof I affix my signature in presence of two witnesses.

CLEVELAND G. DAVIS. [L. S.]

Witnesses:
JAMES L. SIBBEN,
KATHRYN CICHY.